United States Patent Office 3,484,255
Patented Dec. 16, 1969

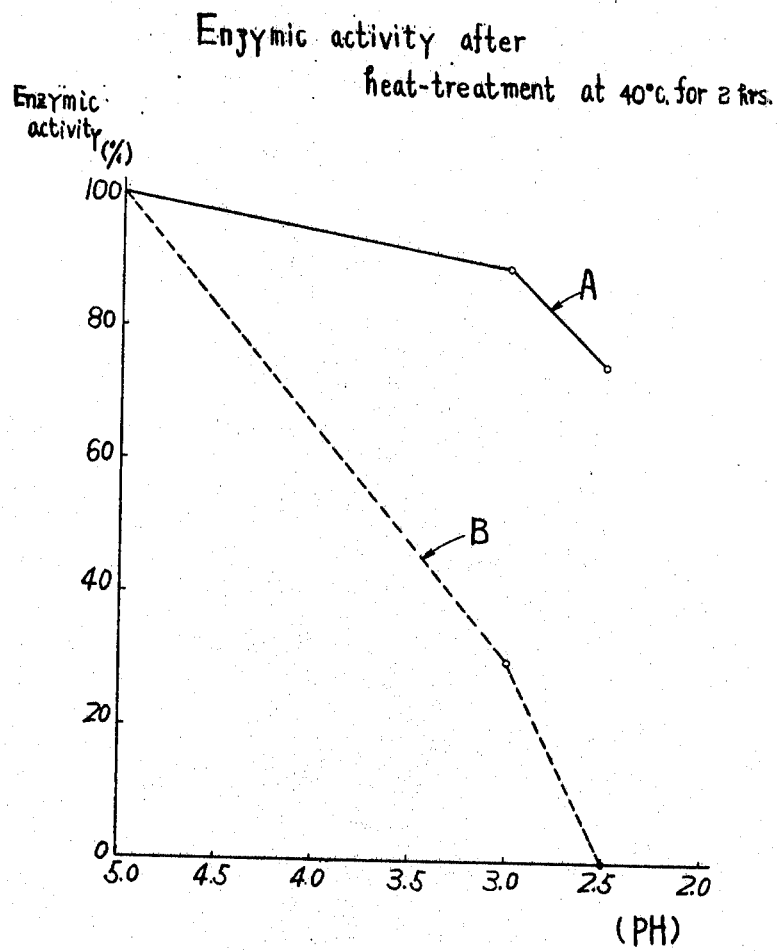

3,484,255
PREVENTION OF CLOUDING OF SYRUP IN WHICH CANNED ORANGE SEGMENTS ARE PRESERVED
Shigetaka Okada, Nara-shi, and Masayuki Ono, Osaka-shi, Japan, assignors to Tanabe Seiyaku Co., Ltd., Osaka-shi, Japan
Filed Mar. 8, 1966, Ser. No. 532,726
Claims priority, application Japan, Mar. 12, 1965, 40/14,465
Int. Cl. A23b 7/00
U.S. Cl. 99—154                                6 Claims

ABSTRACT OF THE DISCLOSURE

Prevention of clouding of syrup in which canned orange segments are preserved by including therein a thermostable hesperidinase I before pasteurization.

---

This invention relates to the canned orange segments-preserving syrup cloud prevention method, and more particularly to a method of preventing, by the action of a specific enzyme, the canned orange segments-preserving syrup from turning cloudy during storage.

One of the drawbacks markedly lowering the market value of the canned orange is the clouding of the preserving syrup during storage. This clouding phenomenon is caused by the water-insoluble hesperidin having the formula:

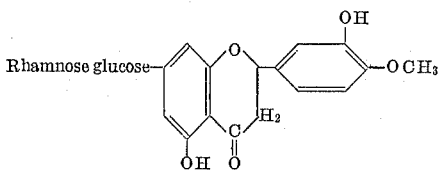

which is present in the orange segments and migrates therefrom into the preserving syrup and crystallizes out.

The conventional method most generally applied for preventing the preserving syrup from turning cloudy is the addition of methyl cellulose. The added methyl cellulose helps the migrating hesperidin dissolve or disperse in the syrup, thereby preventing the hesperidin from crystallizing out. This method, however, is not satisfactory to produce the desired effect, for it is unable to check the clouding phenomenon from becoming pronounced with the passage of time, a phenomenon which markedly takes place within a 3-month storage period or thereabouts. Further disadvantages accompany this method in that it takes much time and labor to make hardly water-soluble methyl cellulose dissolve in water, and that the addition of methyl cellulose deteriorates the flavor and taste of the canned orange.

To eliminate such defects, it has recently been attempted in the art to remove the cloud-causing hesperidin by the decomposing action of an enzyme. One of these approaches is the utilization of an intracellular enzyme which is prepared by crushing the fungi of *Aspergillus niger* cultivated in an hesperidin-containing medium. The resultant enzyme decomposes hesperidin into rutinose (consisting of rhamnose and glucose) and hesperetin. Since hesperetin is water insoluble, however, no marked improvements have been obtained in the cloud prevention.

Another approach is to dip the peeled orange segments in an extracellular enzyme preparation containing hesperidinase I and hesperidinase II prepared by cultivating *Aspergillus niger* in a rhamnose-containing solid medium. The fatal defect accompanying this method is that said hesperidinase I is poor in heat resistance and almost completely deactivated by the conventional pasteurizing process which is carried out at from 70° to 85° C. for from 1 to 15 minutes. Thus the article to be treated is subjected to enzyme treatment before canning, demanding a complicated and prolonged process to the detriment of industrial enforcement. Namely, the peeled orange segments must be submerged in said enzyme preparation for from several hours to 24 hours for best results, and the sugary content and flavor of the oranges pass into the enzyme preparation, deteriorating the flavor and taste of the resultant oranges.

Hesperidinases I and II, further, respectively split the bond of rhamnose and glucose and that of glucose and hesperetin as shown in the following equations:

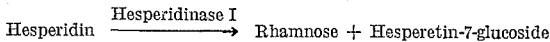

Hesperetin-7-glucoside $\xrightarrow{\text{Hesperidinase II}}$ Glucose + Hesperetin Accordingly, the aforesaid method is unable to prevent the formation of water-insoluble hesperetin resulting from the decomposing action of hesperidinase II.

One object of this invention is therefore the provision of an improved method of preventing the canned orange segments-preserving syrup from turning cloudy by utilization of the action of a specific enzyme.

Another object of the invention is the provision of an improved method of preventing the canned orange segments-preserving syrup from turning cloudy by confining the decomposition of the cloud-causing hesperidin to the formation of water-soluble rhamnose and hesperetin-7-glucoside, whereby the resultant syrup remains immune from clouding for a prolonged period of storage, maintaining a high order of market value of the resultant article.

A further object of the invention is the provision of an improved method of preventing the canned orange segments-preserving syrup from turning cloudy which can be practised on an industrial basis, comprising sealing by admixing an enzyme preparation with the peeled orange segments in a container and then subjecting the article to a conventional pasteurizing process.

The above and other objects of this invention will be made clearer in view of the following description:

Years-long research into hesperidinases by the present inventors has detected the existence of a hesperidinase I having an excelled thermostable property which has not been expected in the prior art. Namely, the conventional series of hesperidinase I is completely deactivated when heated at 40° C. for 2 hours at a pH of 2.5, whereas the new hesperidinase I of this invention is so thermostable that the initial enzymic activity is retained under the same heating condition to the order of at least 50 percent. This new hesperidinase I will be called hereinafter "thermostable hesperidinase I."

The heat resistance of said thermostable hesperidinase I is particularly pronounced, the initial enzymic activity thereof, for instance, being retained to the order of from 30 to 40 percent when heated at 80° C. for 10 minutes at a pH of 3.5 in the presence of glucose or sucrose. This discovery testifies that said thermostable hesperidinase I is stable enough to resist the conventional pasteurizing conditions which are applied to the canned oranges and to retain a satisfactory enzymic activity for a long period of storage following the pasteurizing treatment.

This invention accordingly comprises sealing in a container said thermostable hesperidinase I together with the peeled orange segments and the preserving syrup and then pasteurizing the resultant article according to the conventional method.

According to the principles of this invention, the presence of hesperidinase II in said thermostable hesperidinase I does not produce any harmful side effect. Being poor in heat resistance, hesperidinase II is almost deactivated at 70° C. for 5 minutes at a pH of 4.0 or remains almost inactive in a strongly acidic medium, such as canned orange segments-preserving syrup, so that the activity of the coexisting hesperidinase II, if any, is almost negligible, allowing the thermostable hesperidinase I to fully display the enzymic activity, whereby the hesperidin present in the orange segments is allowed to turn into water-soluble rhamnose and hesperetin-7-glucoside without converting into water-insoluble hesperetin.

In practice, the coexistence of hesperidinase II with said thermostable hesperidinase I to the order of 1:1 unit or more in terms of enzymic activity yields no harmful side effect. Hesperidinase II being useless, however, the amount of hesperidinase II to be allowed to coexist with thermostable hesperidinase I is preferably confined to 1:1 unit or less, preferably to 1:3 unit or less in terms of enzymic activity, the value of which is determined as one unit which is equivalent to the amount required for thermostable hesperidinase I to decompose hesperidin into one milligram of reducing substances at 40° C. for 30 minutes, and for hesperidinase II to decompose 0.5 milligram of hesperidin-7-glucoside at 40° C. for 60 minutes in the presence of 5 percent by weight of glucose.

The thermostable hesperidinase I of this invention is profitably prepared by cultivating with shaking in a rhamnose-containing liquid medium a strain belonging to *Aspergillus niger* having an ability to produce thermostable hesperidinase I, such as *Aspergillus niger* MN7 or *Aspergillus niger* GrM3. The thermostable hesperidinase I-producing strain, however, is not confined to said instances. Other strains producing the desired thermostable hesperidinase I when cultured can naturally be employed in this invention. But those strains which have no ability to produce thermostable hesperidinase I, such as *Aspergillus niger* AN or *Aspergillus niger* F6A0, are unable to produce the desired thermostable hesperidinase I irrespective of the method of cultivation, so that such strains cannot be employed in this invention.

The rhamnose employed in the liquid culture medium of this invention includes rhamnose and rhamnose-containing substances, such as rutin, naringin, hesperidin, *Saphora japonica*, etc. Although the amount to be added to the aqueous medium varies over a wide range, said rhamnose-containing substance must be employed in the order of at least 0.2 percent by weight, preferably within the range of from 0.5 to 1.0 percent by weight, in terms of rhamnose and on the basis of the total weight of the aqueous medium to be employed.

To the aqueous medium, there are further added carbon and/or nitrogen sources, such as soy bean extracts, corn steep liquor, waste molasses, etc., and inorganic substances, such as calcium carbonate, calcium chloride, heptihydrate or magnesium sulfate, and potassium biphosphate.

In order to prevent the admixture of enzymes having a property of decomposing or softening the orange segments, such as hemicellulase or pectinase, such substances as pectin, hemicellulose and/or orange peels, the presence of which results in the formation of said tissue-decomposing enzymes, are desirably excluded as much as possible from the culture medium of this invention.

The cultivation of the culture medium of this invention is carried out by means of submerging or shaking at a temperature ranging from 20° to 40° C. for a period of from 2 to 7 days at a weak alkaline pH of from 4 to 6.5. After cultivation, the culture medium is subjected to conventional processings, such as filtration, salting out with ammonium sulfate, precipitation with a solvent, etc., to produce the desired thermostable hesperidinase I preparation.

The specific features as described hereinbefore of the thermostable hesperidinase I of this invention may further be clearly understood in view of the appended graphic representation, wherein are shown the findings in percentage of the enzymic activity of the thermostable hesperidinase I which is prepared in accordance with the method as described in Example 1 and subjected to testing carried out at 40° C. for 2 hours in the range of pH of from 2.5 to 5.0. Control value shown is that of the enzyme prepared from *Aspergillus niger* AN having no thermostable hesperidinase I-producing ability. In view of said graphic representation, it will also be apparent that the thermostable hesperidinase I of this invention has an ability to display an excelled thermostability over a wide range of pH, and that said enzyme is sufficiently stable in the sealed syrup having a pH of from 3.0 to 4.5.

The thermostable hesperidinase I preparation of this invention is employed by canning it together with the peeled orange segments and syrup according to the conventional method. Said preparation is added separately or dissolved in the syrup before canning in the order of at least one unit or from 5 to 20 units by enzymic activity per 250 grams of peeled orange segments. Addition in more volume, such as 100 units by enzymic activity, does not invite any harmful effect.

The pasteurizing process is carried out according to the conventional method, namely, at a syrup temperature of from about 70° to 85° C. (corresponding to a bath temperature of from 72° to 88° C.), or preferably at a syrup temperature of from 70° to 78° C., for from 1 to 15 minutes, preferably from 2 to 5 minutes, although there is a wider variation in the range of heating period in accordance with modifications in the heating temperature.

Hereinafter are disclosed preferred examples, wherein all parts are by weight.

EXAMPLE 1

| | Parts |
|---|---|
| Powdered soy bean extracts | 2.0 |
| Corn steep liquor | 2.0 |
| Rutin | 2.0 |
| Glucose | 2.0 |
| $KH_2PO_4$ | 0.2 |
| $CaCl_2$ | 0.0005 |
| $MgSO_2 \cdot 7H_2O$ | 0.01 |
| $CaCO_3$ | 0.6 |
| Water | 100.0 |

In the culture medium of the above composition was inoculated *Aspergillus niger* MN7, while maintaining the medium at a pH of 6.0 with 5 percent sodium hydroxide added dropwise. After cultivation with shaking at 30° C. for 4 days, the culture medium was filtered and the filtrate containing hesperidinase I of an enzymic activity of 15 units per milliliter and hesperidinase II of an enzymic activity of one unit per milliliter was salted out with ammonium sulfate. The resultant precipitate was dried and pulverized, producing an enzyme preparation containing thermostable hesperidinase I of an enzymic activity of 400 units per gram and hesperidinase II of an enzymic activity of 50 units per gram. There was contained substantially no pectinase.

With this enzyme preparation was admixed glucose and the mixture having a total enzymic activity of 100 units per gram was added in amounts as specified in Table 1 below to 80 grams of syrup having a saccharide content in a concentration of 40 precent by volume and then placed in a 318.7-milliliter container (74.1 millimeters in internal diameter and 81.3 millimeters deep) with 250 grams of peeled mandarin orange segments.

After being sealed hermetically, the canned article was pasteurized at a bath temperature of 82° C. (corresponding to a syrup temperature of 80° C.) for 10 minutes by means of a rotary pasteurizer revolving at a rate of 4 revolutions per minute, cooled with cold water for 10 minutes and allowed to stand at room temperature.

The syrup thus treated was examined for cloudiness, the mean findings of which per 5 containers are shown in Table 1.

TABLE 1.—CLOUDINESS IN MILLIMETERS

| Syrup | Enzymic activity in units | Storage period | | | | | |
|---|---|---|---|---|---|---|---|
| | | 24 hours | 15 days | 30 days | 60 days | 90 days | 180 days |
| Enzyme-treated | 2 | 178 | 151 | 155 | 153 | 147 | 144 |
| | 5 | 187 | 176 | 190 | 202 | 200 | 182 |
| This invention | 10 | 183 | 172 | 197 | 199 | 195 | 175 |
| | 50 | 180 | 167 | 180 | 185 | 178 | 170 |
| Non-treated | | 171 | 41 | 43 | 36 | 29 | 31 |
| Methyl cellulose-treated | | 177 | 103 | 91 | 88 | 75 | 71 |

N.B.—1. Methyl cellulose was employed in the order of 10 p.p.m.

2. The degree of cloudiness was determined by the naked eye in terms of a column height in millimeters of the syrup which was poured into a transparent cylindrical test tube, 27 millimeters in internal diameter, until the black spot printed on a sheet of white paper, on which said cylindrical test tube was erected, disappeared under the accumulated syrup.

EXAMPLE 2

| | Parts |
|---|---|
| Powdered soy bean extracts | 3.5 |
| Corn steep liquor | 1.5 |
| *Saphora japonica* | 2.0 |
| Hesperidin | 1.5 |
| Lactose | 1.0 |
| $KH_2PO_4$ | 0.2 |
| $CaCl_2$ | 0.0005 |
| $MgSO_4 \cdot 7H_2O$ | 0.01 |
| Water | 100.0 |

In the culture medium of the above composition was inoculated *Aspergillus niger* GrM3 and cultivated with shaking at about 30° C. for 5 days. The culture medium was then filtered and the filtrate (containing hesperidinase I of an enzymic activity of from 25 to 35 units per milliliter) was treated with active carbon to remove color and odor, and admixed with methanol. The resultant precipitate was filtered and dried, producing an enzyme preparation containing hesperidinase I of an enzymic activity of 40 units per gram and hesperidinase II of an enzymic activity of 80 units per gram.

This preparation was then added to glucose, and the resultant preparation having a total enzymic activity of 100 units per gram was added in the order of 0.1 gram to 88 grams of syrup having a saccharide content in a concentration of 40 percent by volume and placed in a 318.7-milliliter container (74.1 millimeters in internal diameter and 81.3 millimeters deep) with 235 grams of peeled mandarin orange segments.

After being sealed hermetically, the canned article was pasteurized at a bath temperature of 81° C. (corresponding to a syrup temperature of 79° C.) for 10 minutes by means of a rotary pasteurizer revolving at a rate of 4 revolutions per minute, cooled with cold water for 10 minutes and allowed to stand at room temperature.

Findings obtained are shown in Table 2, wherein the cloudiness detecting test was performed according to the method described in Example 1 and control methyl cellulose was employed in the order of 10 p.p.m. as in Example 1.

TABLE 2.—CLOUDINESS IN MILLIMETERS

| Syrup | Storage period | |
|---|---|---|
| | 24 hours | 15 days |
| Hesperidinase-treated of this invention | 100< | 131 |
| Non-treated | 100< | 42 |
| Methyl cellulose-treated | 100< | 105 |

The supernatant liquid phase separated by centrifugation from the syrup after 1 month of storage was extracted with ethyl acetate and subjected to thin-layer chromatographic analysis, showing a marked accumulation of hesperetin-7-glucoside in the treated syrup and a large amount of hesperidin in the non-treated syrup.

We claim:

1. A method of preventing the clouding of syrup in which canned orange segments are contained, comprising the steps of sealing in a container with peeled orange segments and syrup a thermostable hesperidinase I in the order of at least 1 unit in terms of enzymic activity per 250 grams of peeled orange segments, said thermostable hesperidinase I being a substance having a property of retaining initial enzymic activity in the order of at least 50 percent after heat-treatment carried out at 40° C. for 10 minutes at a pH of 2.5, and then subjecting said sealed article to heating at a syrup temperature ranging from 70° to 85° C. for from 1 to 15 minutes.

2. The canned orange segments-preserving syrup cloud prevention method as claimed in claim 1, wherein said thermostable hesperidinase I is added in the order of from 5 to 20 units per gram in terms of enzymic activity per 250 grams of peeled orange segments.

3. The canned orange segments-preserving syrup cloud prevention method as claimed in claim 1, wherein said thermostable hesperidinase I is prepared by cultivating a thermostable hesperidinase I-producing *Aspergillus niger* strain in a culture medium containing a rhamnose-containing substance in the order of at least 0.2 percent by weight in terms of rhamnose on the basis of the total weight of the aqueous medium employed.

4. The canned orange segments-preserving syrup cloud prevention method as claimed in claim 3, wherein said *Aspergillus niger* strain is one member selected from the group consisting of *Aspergillus niger* GrM3 and *Aspergillus niger* MN7.

5. The canned orange segments-preserving syrup cloud prevention method as claimed in claim 3, wherein said rhamnose-containing substance is at least one member selected from the group consisting of rhamnose, rutin, naringin and *Saphora japonica*.

6. The canned orange article prepared in accordance with the method as specified in claim 1.

References Cited

UNITED STATES PATENTS 1,932,833  10/1953  Willaman et al. _____ 99—106
2,950,974  8/1960   Smythe et al. _____ 99—106

RAYMOND N. JONES, Primary Examiner

JAMES R. HOFFMAN, Assistant Examiner

U.S. Cl. X.R.

99—186; 195—2, 35, 62, 66